US012610931B1

(12) United States Patent    (10) Patent No.:    US 12,610,931 B1
Walrath                         (45) Date of Patent:        Apr. 28, 2026

(54) SLING FISHING REEL

(71) Applicant: Michael D. Walrath, Miami, FL (US)

(72) Inventor: Michael D. Walrath, Miami, FL (US)

( * ) Notice: Subject to any disclaimer, the term of this patent is extended or adjusted under 35 U.S.C. 154(b) by 0 days.

(21) Appl. No.: 18/958,295

(22) Filed: Nov. 25, 2024

(51) Int. Cl.
    *A01K 89/08*    (2006.01)
    *A01K 87/06*    (2006.01)
    *A01K 87/08*    (2006.01)

(52) U.S. Cl.
    CPC .............. *A01K 89/08* (2013.01); *A01K 87/06* (2013.01); *A01K 87/08* (2013.01)

(58) Field of Classification Search
    CPC ........ A01K 89/08; A01K 87/06; A01K 87/08; A01K 87/00; A01K 87/008; A01K 87/009; A01K 91/02; A01K 91/00
    See application file for complete search history.

(56) References Cited

U.S. PATENT DOCUMENTS

| | | | | |
|---|---|---|---|---|
| 764,853 A | * | 7/1904 | Kimberlin | A01K 91/02 124/80 |
| 980,942 A | * | 1/1911 | Hanson | A01K 87/08 43/21.2 |
| 1,898,323 A | * | 2/1933 | Teetor | A01K 87/08 43/18.1 R |
| 2,000,263 A | * | 5/1935 | Teetor | A01K 87/06 43/23 |
| 2,084,931 A | * | 6/1937 | Williams | A01K 87/08 43/23 |

| | | | | |
|---|---|---|---|---|
| 2,089,744 A | * | 8/1937 | Golden | A01K 91/02 124/37 |
| 2,158,396 A | * | 5/1939 | Birnstock | A01K 91/02 43/18.1 R |
| 2,225,719 A | * | 12/1940 | Shotton | A01K 91/02 124/16 |
| 2,236,603 A | * | 4/1941 | Nelson | A01K 87/08 43/22 |
| 2,283,816 A | * | 5/1942 | Loutrel | A01K 87/08 43/25 |
| 2,645,218 A | * | 7/1953 | Fisher | A01K 91/02 124/21 |
| 2,952,091 A | * | 9/1960 | Blanchard | F41C 3/00 43/42.49 |
| 3,000,129 A | * | 9/1961 | Rainey | A01K 91/02 43/19 |
| 3,015,182 A | * | 1/1962 | Tuttle | A01K 91/02 43/6 |

(Continued)

FOREIGN PATENT DOCUMENTS

| | | | |
|---|---|---|---|
| CN | 2156466 Y | * | 2/1994 |
| CN | 2178048 Y | * | 9/1994 |

(Continued)

*Primary Examiner* — Katelyn T Truong

(74) *Attorney, Agent, or Firm* — Albert Bordas, Esq.

(57) ABSTRACT

A sling fishing reel, which has a gun assembly, a frame assembly, and a fishing reel. The gun assembly has a gun body, a line guide having a line guide slot, a faux trigger, a trigger guard, and a thumb rest slot. The frame assemble has an upper lateral support, a lower lateral support, a handle rod, a rod butt gimbal, an arm support wire, and an arm support. The gun body receives the arm support wire and the upper lateral support at its top. The frame assembly has a reel sit tube and first and second reel wedges. The fishing reel is attached to the reel sit tube.

6 Claims, 8 Drawing Sheets

(56)                References Cited

U.S. PATENT DOCUMENTS

| | | | | |
|---|---|---|---|---|
| 3,129,525 | A * | 4/1964 | Lewis | A01K 91/02 |
| | | | | 124/24.1 |
| 3,245,170 | A * | 4/1966 | Macdonald | A01K 91/02 |
| | | | | 124/16 |
| 3,261,123 | A * | 7/1966 | Gugliotta | A01K 91/02 |
| | | | | 43/19 |
| 3,279,115 | A * | 10/1966 | Worsham | A01K 91/02 |
| | | | | 124/66 |
| 3,292,295 | A * | 12/1966 | Saltness | A01K 91/02 |
| | | | | 43/19 |
| 3,392,473 | A * | 7/1968 | Dietsch | A01K 91/02 |
| | | | | 42/76.01 |
| 3,401,480 | A * | 9/1968 | Halstead | A01K 91/02 |
| | | | | 43/19 |
| 3,491,475 | A * | 1/1970 | Mann | A01K 89/015 |
| | | | | 43/20 |
| 3,511,221 | A * | 5/1970 | Saunders | F41B 3/02 |
| | | | | 124/80 |
| 3,683,882 | A * | 8/1972 | Braxton | F41B 7/04 |
| | | | | 124/20.3 |
| 4,056,859 | A * | 11/1977 | Pace | H02G 1/1204 |
| | | | | 254/134.3 FT |
| 4,110,929 | A * | 9/1978 | Weigand | A01K 91/02 |
| | | | | 124/71 |
| 4,127,956 | A * | 12/1978 | Hertkorn | F41B 3/02 |
| | | | | 43/19 |
| 4,265,212 | A * | 5/1981 | Wolf | F41B 3/02 |
| | | | | 124/20.1 |
| D267,580 | S * | 1/1983 | Price | D22/138 |
| 4,373,503 | A * | 2/1983 | Saunders | F41B 3/02 |
| | | | | 124/20.1 |
| 4,756,113 | A * | 7/1988 | Eggertson | A01K 91/02 |
| | | | | 43/19 |
| 4,793,087 | A * | 12/1988 | McGee | A01K 87/08 |
| | | | | 43/22 |
| 4,845,879 | A * | 7/1989 | Urso | A01K 87/00 |
| | | | | 43/18.1 R |
| 4,962,608 | A * | 10/1990 | Loomis | A01K 87/00 |
| | | | | 43/18.1 R |
| 5,493,807 | A * | 2/1996 | Sullins | A01K 91/02 |
| | | | | 43/19 |
| D377,204 | S * | 1/1997 | Athanasiadis | D22/134 |
| 6,053,156 | A * | 4/2000 | Boon | F42B 6/00 |
| | | | | 124/20.1 |
| 6,286,495 | B1 * | 9/2001 | Brown | F41B 3/02 |
| | | | | 124/20.1 |
| 6,854,206 | B2 * | 2/2005 | Oz | F41G 1/35 |
| | | | | 42/111 |
| 6,968,835 | B2 * | 11/2005 | Lee | F41B 3/02 |
| | | | | 124/20.1 |
| 8,499,486 | B1 * | 8/2013 | Thomsen | A01K 91/02 |
| | | | | 43/19 |
| 8,910,407 | B2 * | 12/2014 | Singh | F41C 23/06 |
| | | | | 89/37.04 |
| 9,038,615 | B2 * | 5/2015 | Saunders | F41B 3/02 |
| | | | | 124/80 |
| 9,220,249 | B1 * | 12/2015 | Bailey | A01K 81/00 |
| 10,091,977 | B2 * | 10/2018 | Braun | A01K 81/00 |
| 11,385,016 | B1 * | 7/2022 | Allen | F41B 7/003 |
| 11,815,326 | B2 * | 11/2023 | Barnett | B05D 7/544 |
| 12,052,980 | B1 * | 8/2024 | Stirling | A01K 87/02 |
| 2007/0062095 | A1 * | 3/2007 | Euliano | A01K 91/02 |
| | | | | 43/19 |
| 2014/0283803 | A1 * | 9/2014 | Maccarrick | F41B 5/143 |
| | | | | 124/20.3 |
| 2015/0135574 | A1 * | 5/2015 | Jen | F41G 11/003 |
| | | | | 42/90 |
| 2018/0360016 | A1 * | 12/2018 | Denton | A01K 87/08 |

FOREIGN PATENT DOCUMENTS

| | | | | |
|---|---|---|---|---|
| CN | 1217872 | A * | 6/1999 | |
| CN | 109258593 | A * | 1/2019 | A01K 87/00 |
| KR | 820001627 | Y1 * | 8/1982 | A01K 97/02 |
| KR | 930000517 | Y1 * | 2/1993 | |
| KR | 102619283 | B1 * | 12/2023 | A01K 89/012 |
| WO | WO-2012075036 | A1 * | 6/2012 | A01K 87/00 |

* cited by examiner

SLING FISHING REEL

BACKGROUND OF THE INVENTION

The present invention relates to fishing reels, and more particularly, to a sling fishing reel.

PRIOR ART

Applicant is not aware of any fishing reel having the novel features of the present invention.

SUMMARY OF THE INVENTION

The present invention is a sling fishing reel, comprising a gun assembly, a frame assembly, and a fishing reel.

The gun assembly comprises a gun body, a line guide having a line guide slot, a faux trigger, a trigger guard, and a thumb rest slot. The line guide is attached at a front end of the gun body.

The gun assembly further comprises a picatinny reel mounted onto the gun body and an adjustable D-ring with a picatinny mount. The gun assembly further comprises a right handle grip and a left handle grip having respective holes.

The frame assemble comprises an upper lateral support, a lower lateral support, a handle rod, a rod butt gimbal, an arm support wire, and an arm support.

The gun body receives the arm support wire and the upper lateral support at its top. The upper lateral support is fixed to the gun body, whereby the arm support wire extends outwardly between the upper lateral support and the gun body.

The frame assembly further comprises a reel sit tube and first and second reel wedges. The reel sit tube comprises reel sit tube holes, threads, a lateral hole, an anti-rotation pin, and anti-rotation pin insertion hole. The reel sit tube receives first and second reel wedges, a knurled jam nut, and a washer.

The lower lateral support is attached at the bottom part of the gun body. The upper lateral support comprises a bottom end, wherein the bottom end is attached to a first end of the reel sit tube. The lower lateral support comprises a lateral end, wherein the lateral end is attached to a second end of the reel sit tube.

The handle rod passes through a back section of the gun body along a grip toward the top of the gun body. The handle rod comprises first and second screw tapped holes. The first screw tapped hole receives an attachment screw, which fix the upper lateral support and the arm support wire to the top of the gun body.

The fishing reel is attached to the reel sit tube.

It is therefore one of the main objects of the present invention to provide a sling fishing reel.

It is another object of this invention to provide a sling fishing reel having a frame assembly, a gun assembly and a fishing reel.

It is another object of this invention to provide a sling fishing reel, which is a "Rod-less" fishing platform for deep sea fishing.

It is another object of this invention to provide a sling fishing reel that is volumetrically efficient for carrying, transporting, and storage.

It is another object of this invention to provide a sling fishing reel that can be readily assembled and disassembled without the need of any special tools.

It is another object of this invention to provide a sling fishing reel, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF DRAWINGS

With the above and other related objects in view, the invention consists in the details of construction and combination of parts as will be more fully understood from the following description, when read in conjunction with the accompanying drawings in which.

DETAILED DESCRIPTION OF THE INVENTION

Figure 1:
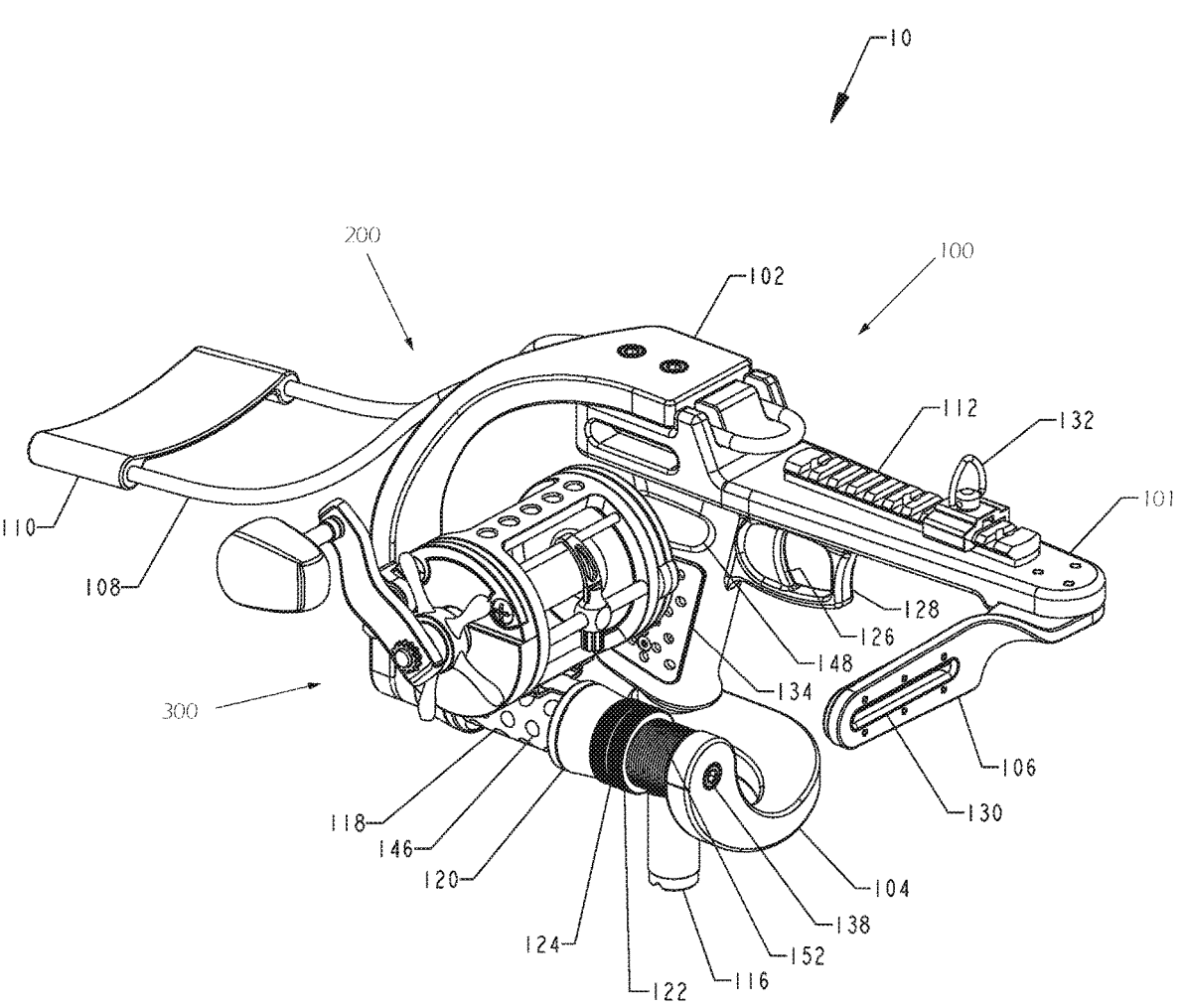
FIG. 1 represents a right front isometric view of the present invention.

Referring now to the drawings, the present invention is a sling fishing reel and is generally referred to with numeral 10. It can be observed that it basically includes gun assembly 100, frame assembly 200, and fishing reel 300.

Figure 2:
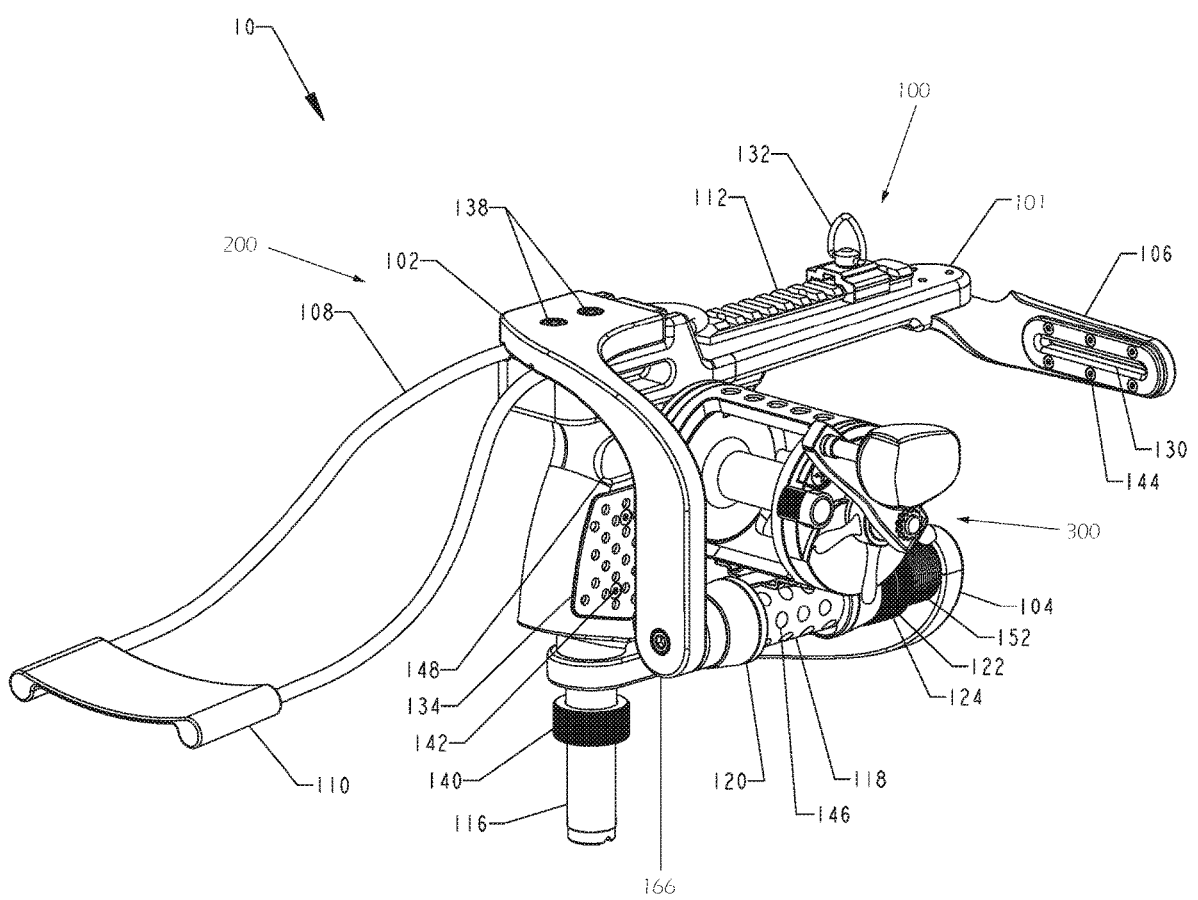
FIG. 2 is a right rear isometric view of the present invention.
Figure 3:
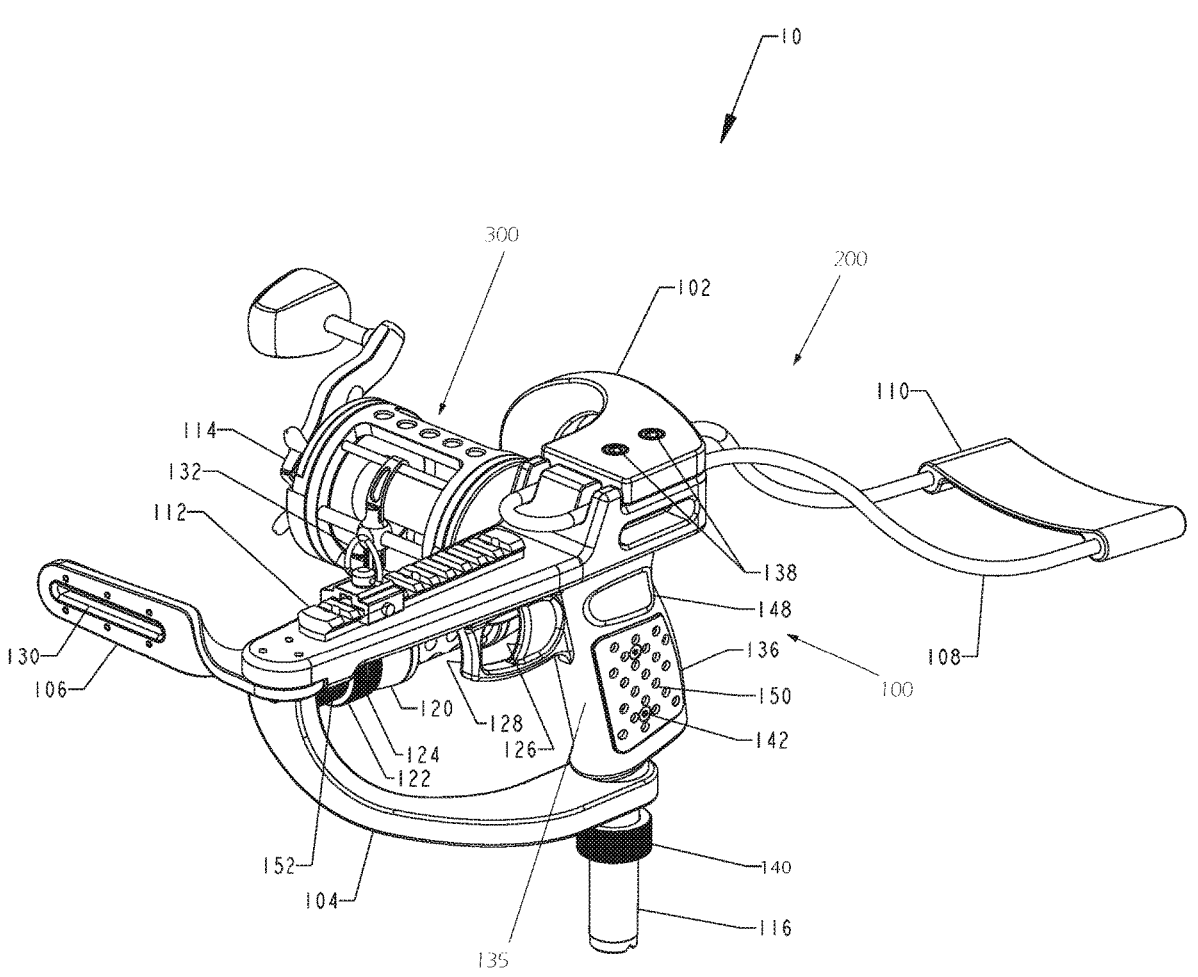
FIG. 3 is a left front isometric view of the present invention.

As seen in FIGS. 1, 2, and 3 frame assembly 200 mounts onto gun assembly 100. Present invention 10 is a "Rod-less" fishing platform, for deep sea fishing.

Gun assembly 100 comprises gun body 101, line guide 106 having line guide slot 130, faux trigger 126, trigger guard 128, and thumb rest slot 148. Line guide 106 is attached at a front end of gun body 101.

Figure 7:
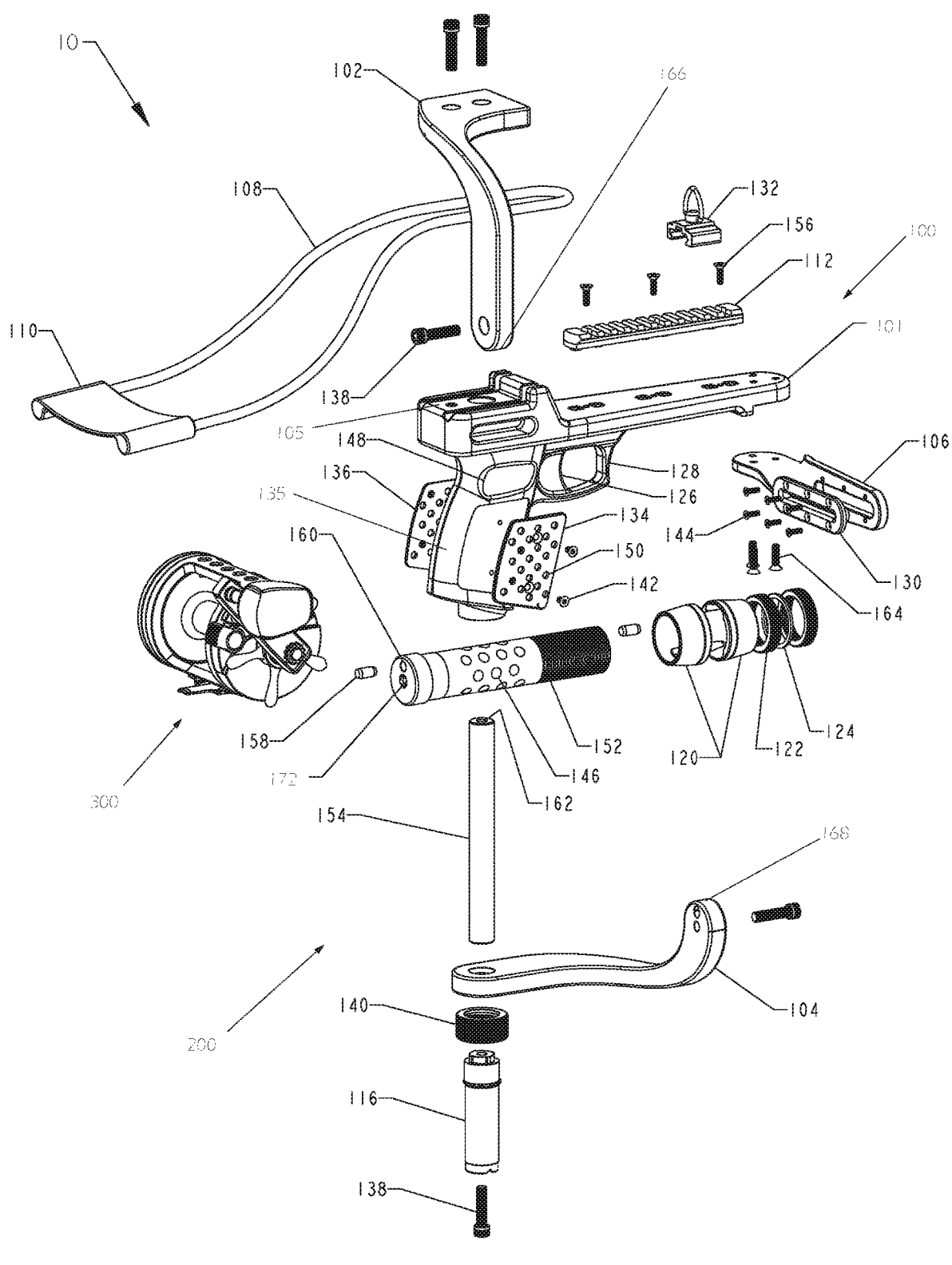
FIG. 7 is an exploded view of the invention.

Line guide 106 comprises line guide slot attachment screws 144 and line guide attachment screws 164, seen in FIG. 7.

Gun assembly 100 further comprises picatinny reel 112 mounted onto gun body 101 and adjustable D-ring 132 with a picatinny mount. Picatinny reel 112 is secured onto gun body 101 by picatinny reel attachment screws 156, seen in FIG. 7. Adjustable D-ring 132 mounts onto picatinny reel 112.

Gun assembly 100 further comprises grip 135 having right handle grip 134 and left handle grip 136 having respective holes 150. Right handle grip 134 and left handle grip 136 are secured by handle grip attachment screws 142. Holes 150 are cosmetics.

Frame assembly 200 comprises upper lateral support 102, lower lateral support 104, rod butt gimbal 116, arm support wire 108, arm support 110, and rod butt gimbal nut 140.

Figure 4:
FIG. 4 is a left rear isometric view of the present invention.
Figure 4:
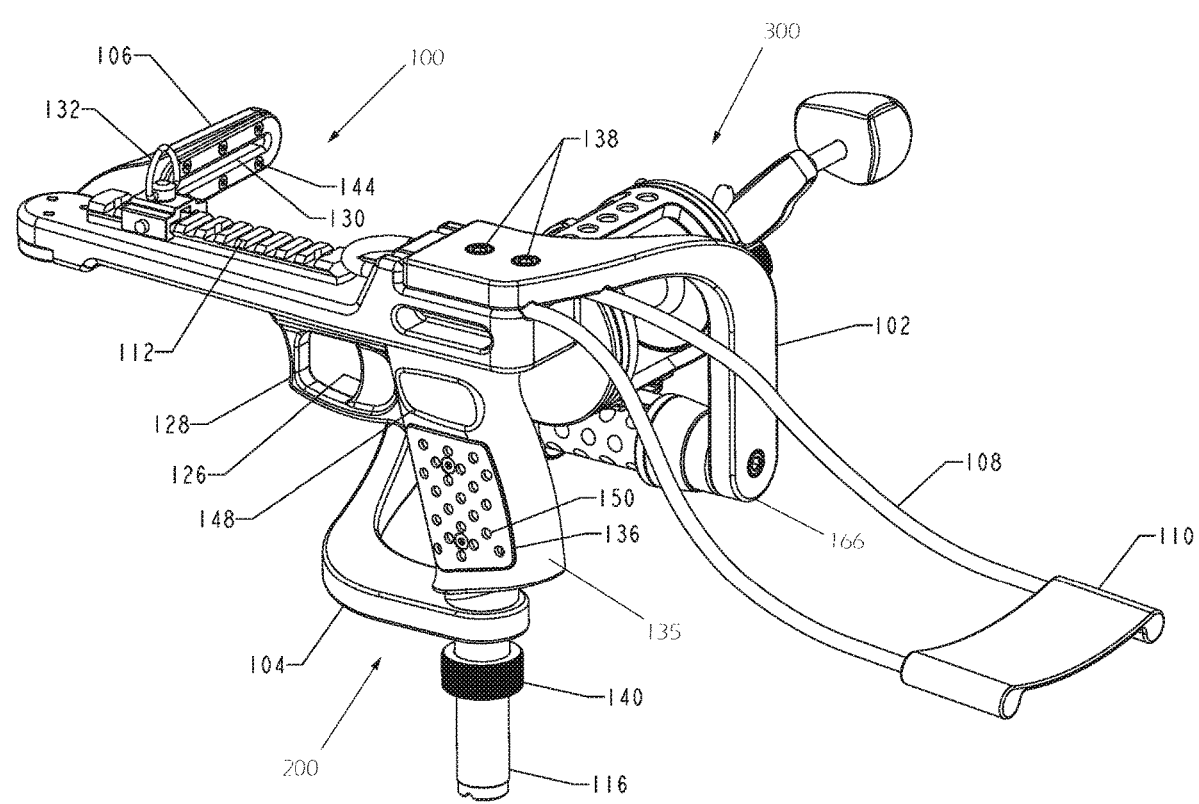
Figure 5:
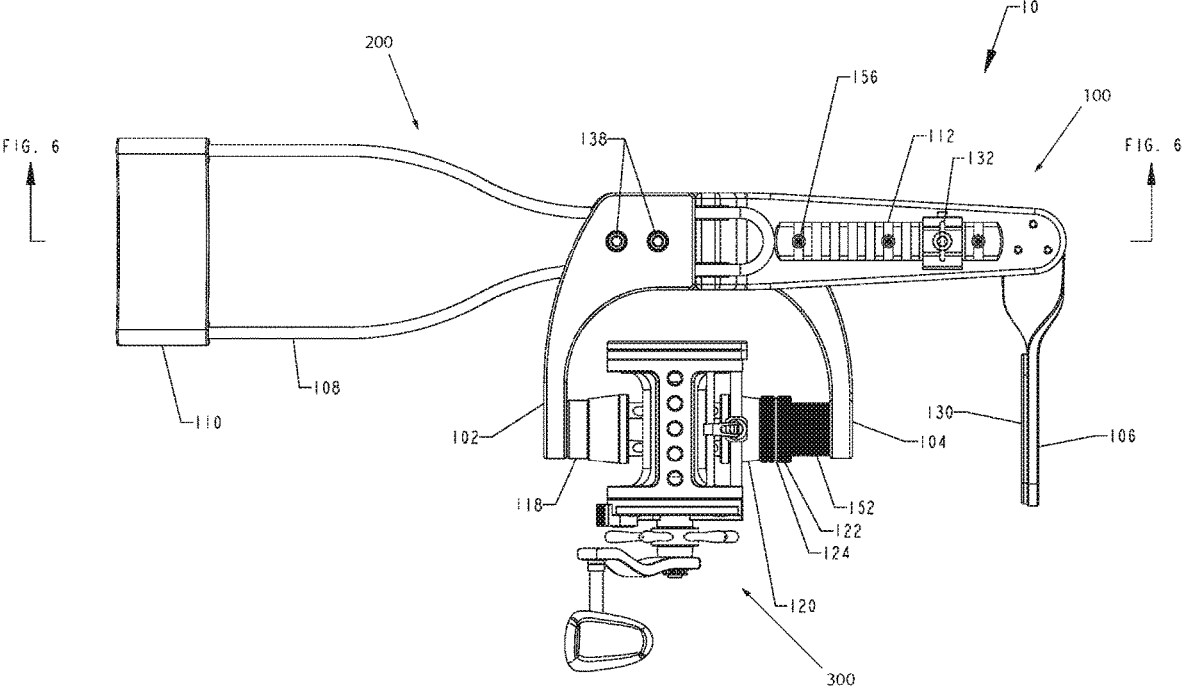
FIG. 5 is a top view of the present invention.

As seen in FIGS. 4 and 5, gun body 101 receives arm support wire 108 and upper lateral support 102 at its top 105. Upper lateral support 102 is fixed to gun body 101 by attachments screws 138, whereby arm support wire 108 extends outwardly between upper lateral support 102 and gun body 101.

Frame assembly 200 further comprises reel sit tube 118 and first and second reel wedges 120.

Fishing reel 300 is attached to frame assembly 200, whereby fishing reel 300 mounts onto reel sit tube 118.

Figure 6:
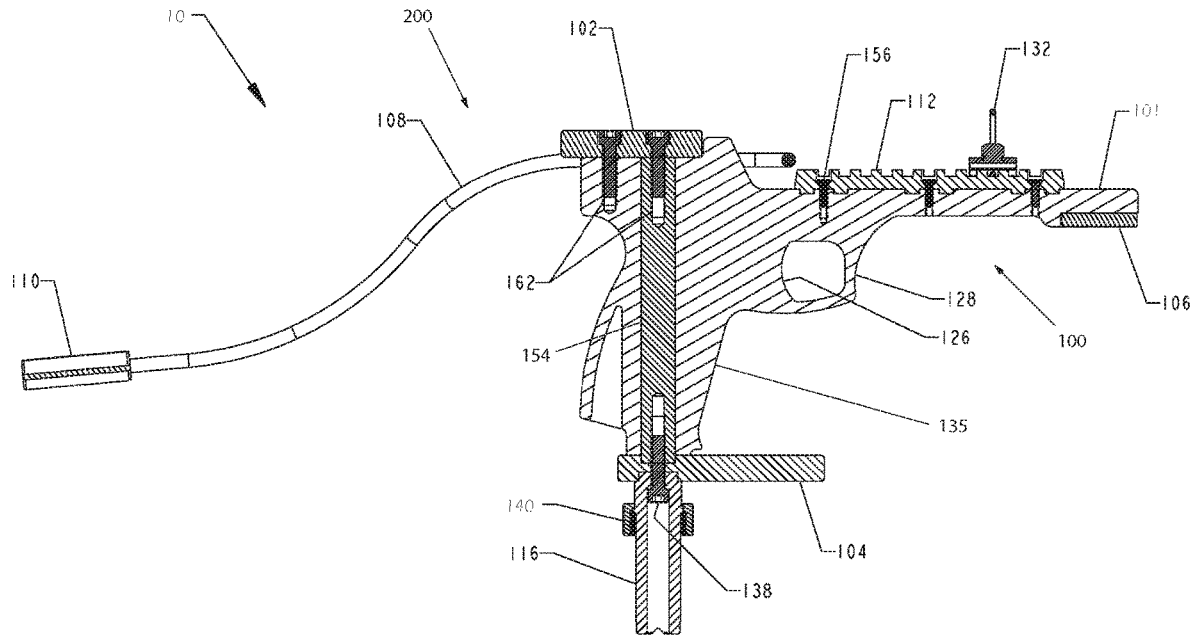
FIG. 6 is a cross-section view taken along lines 6-6 on FIG. 5.
Figure 8:
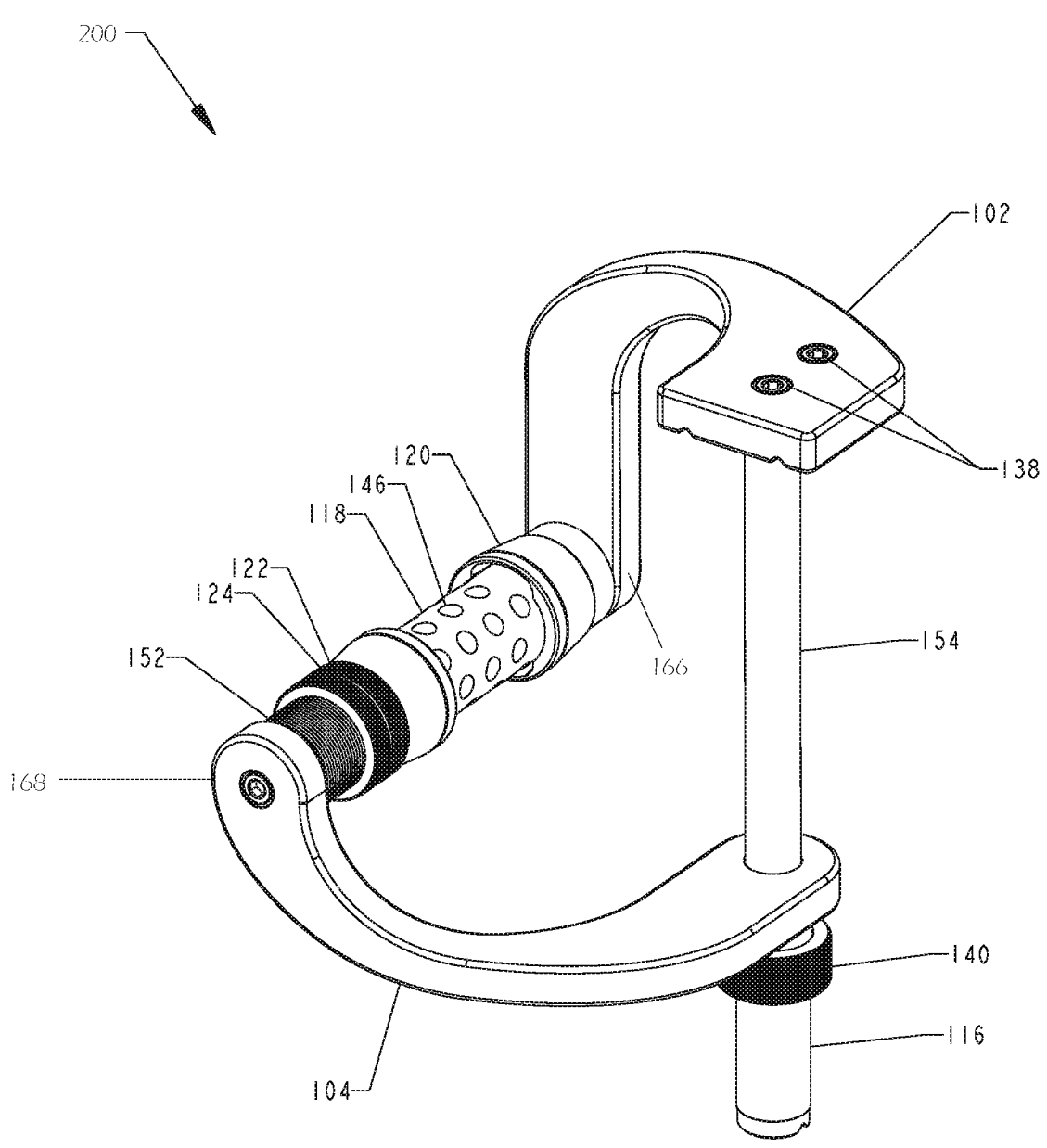
FIG. 8 is a left front isometric view of the frame assembly.

As seen in FIGS. 6, 7, and 8, reel sit tube 118 comprises reel sit tube holes 146, threads 152, lateral hole 172, anti-rotation pin 158, and anti-rotation pin insertion hole 160. Reel sit tube 118 receives first and second reel wedges 120, knurled jam nut 122, and washer 124.

Lower lateral support 104 is attached at the bottom part of gun body 101. Upper lateral support 102 comprises bottom end 166, wherein bottom end 166 is attached to a first end of reel sit tube 118. Lower lateral support 104 comprises lateral end 168, wherein lateral end 168 is attached to a second end of reel sit tube 118.

Frame assembly 200 further comprises handle rod 154. Handle rod 154 comprises first and second screw tapped holes 162.

Handle rod 154 passes through a back section of gun body 101 along grip 135 toward top 105 of gun body 101. First screw tapped hole 162 receives attachment screw 138, which fix upper lateral support 102 and arm support wire 108 to top 105 of gun body 101.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A sling fishing reel, comprising:

A) a gun assembly comprising a gun body, a line guide having a line guide slot, a faux trigger, a trigger guard, a thumb rest slot, a picatinny rail mounted onto said gun body and an adjustable D-ring with a picatinny mount, wherein said gun assembly further comprises a right handle grip and a left handle grip having respective holes;

B) a frame assembly mounting onto said gun assembly wherein said frame assembly comprises an upper lateral support, a lower lateral support, a handle rod, a rod butt gimbal, an arm support wire, and an arm support, wherein said gun body receives said arm support wire and said upper lateral support at its top, whereby said upper lateral support is fixed to said gun body, and said arm support wire extends outwardly between said upper lateral support and said gun body, said frame assembly further comprises a reel sit tube and first and second reel wedges, said lower lateral support is attached at the bottom part of said gun body, said handle rod comprises first and second screw tapped holes, said first screw tapped hole receives an attachment screw, which fix said upper lateral support and said arm support wire to said top of said gun body; and C) a fishing reel attached to said reel sit tube, wherein said reel sit tube comprises reel sit tube holes, threads, a lateral hole, an anti-rotation pin, and anti-rotation pin insertion hole.

2. The sling fishing reel set forth in claim 1, wherein said reel sit tube receives said first and second reel wedges, a knurled jam nut, and a washer.

3. The sling fishing reel set forth in claim 2, wherein said upper lateral support comprises a bottom end, wherein said bottom end is attached to a first end of said reel sit tube.

4. The sling fishing reel set forth in claim 3, wherein said lower lateral support comprises a lateral end, wherein said lateral end is attached to a second end of said reel sit tube.

5. The sling fishing reel set forth in claim 1, wherein said handle rod passes through a back section of said gun body, along a grip, toward said top of said gun body.

6. The sling fishing reel set forth in claim 1, wherein said line guide is attached at a front end of said gun body.

* * * * *